(12) United States Patent
Tomchek et al.

(10) Patent No.: US 8,606,662 B2
(45) Date of Patent: Dec. 10, 2013

(54) METHODS AND SYSTEMS FOR MANAGING CO-BRAND PROPRIETARY FINANCIAL TRANSACTION PROCESSING

(75) Inventors: Brad Michael Tomchek, St. Charles, MO (US); Jill E. Chong, Ballwin, MO (US); Suman Rausaria, Ballwin, MO (US); Cathrine Lee Bone, St. Louis, MO (US); Linda L. McCorkell, St. Peters, MO (US); Shoon Ping Wong, St. Charles, MO (US); Janet Smith, Des Peres, MO (US)

(73) Assignee: MasterCard International Incorporated, Purchase, NY (US)

( * ) Notice: Subject to any disclaimer, the term of this patent is extended or adjusted under 35 U.S.C. 154(b) by 533 days.

(21) Appl. No.: 12/416,727

(22) Filed: Apr. 1, 2009

(65) Prior Publication Data

US 2009/0254462 A1 Oct. 8, 2009

Related U.S. Application Data

(60) Provisional application No. 61/042,585, filed on Apr. 4, 2008.

(51) Int. Cl.
| | |
|---|---|
| *G07B 17/00* | (2006.01) |
| *G07F 19/00* | (2006.01) |
| *G06Q 40/00* | (2012.01) |
| *G06Q 40/06* | (2012.01) |
| *G06Q 20/10* | (2012.01) |
| *G07F 7/10* | (2006.01) |

(52) U.S. Cl.
CPC ............... *G06Q 40/00* (2013.01); *G06Q 40/06* (2013.01); *G06Q 20/10* (2013.01); *G07F 7/1008* (2013.01)
USPC ............... 705/30; 705/14.17; 705/17; 705/38; 705/39; 235/375; 235/379; 235/380; 235/381

(58) Field of Classification Search
CPC ....... G06Q 40/00; G06Q 40/06; G06Q 20/10; G06Q 40/025; G06Q 30/02; G07F 7/1008; G07F 7/08
USPC ............ 705/35, 39, 40, 14.17, 17, 38, 14.34, 705/14.26, 14.27, 14.25, 14.38; 235/375, 235/379, 380, 381

See application file for complete search history.

(56) References Cited

U.S. PATENT DOCUMENTS 5,590,038 A 12/1996 Pitroda
(Continued)

OTHER PUBLICATIONS

Private label purchase card acceptance systems developed by inventors. (Dec. 8, 2010). Targeted News Service. Retrieved from http://search.proquest.com/docview/816468568?accountid=14753.*

(Continued)

*Primary Examiner* — Matthew Gart
*Assistant Examiner* — Olusegun Goyea
(74) *Attorney, Agent, or Firm* — Armstrong Teasdale LLP

(57) ABSTRACT

A method and system for processing a financial transaction using a co-brand proprietary payment card through a multi-party payment card interchange network is provided. The method includes storing within a database a list of merchants participating in a co-brand program with the interchange network, receiving an authorization request for the transaction involving the co-brand payment card wherein the authorization request includes a merchant identifier, determining whether the transaction originated at one of the participating merchants by comparing the received merchant identifier to the list of participating merchants stored within the database, manipulating the authorization request to include a private label identifier when the transaction is determined to have originated at one of the participating merchants, and transmitting an authorization response from the interchange network to the acquirer. The authorization response includes the private label identifier and designates the transaction for processing as a private label transaction.

35 Claims, 8 Drawing Sheets

(56) References Cited

U.S. PATENT DOCUMENTS

| | | | |
|---|---|---|---|
| 5,870,473 A | 2/1999 | Boesch et al. | |
| 5,956,695 A * | 9/1999 | Carrithers et al. | 705/14.17 |
| 6,169,974 B1 * | 1/2001 | Baumgartner et al. | 705/39 |
| 6,332,134 B1 | 12/2001 | Foster | |
| 6,915,277 B1 * | 7/2005 | Manchester et al. | 705/39 |
| 7,020,633 B2 * | 3/2006 | Strayer et al. | 705/39 |
| 7,043,451 B2 * | 5/2006 | Strayer et al. | 705/39 |
| 7,069,244 B2 * | 6/2006 | Strayer et al. | 705/39 |
| 7,104,443 B1 | 9/2006 | Paul et al. | |
| 7,119,659 B2 * | 10/2006 | Bonalle et al. | 340/5.61 |
| 7,275,685 B2 | 10/2007 | Gray et al. | |
| 7,360,693 B1 * | 4/2008 | Sullivan | 235/380 |
| 7,406,442 B1 * | 7/2008 | Kottmeier et al. | 705/35 |
| 7,424,455 B2 * | 9/2008 | Kellogg et al. | 705/39 |
| 7,496,524 B2 * | 2/2009 | Voltmer et al. | 705/14.12 |
| 7,500,602 B2 | 3/2009 | Gray | |
| 7,575,177 B2 * | 8/2009 | Killian et al. | 235/492 |
| 7,610,233 B1 | 10/2009 | Leong et al. | |
| 7,748,617 B2 | 7/2010 | Gray | |
| 7,752,134 B2 * | 7/2010 | Spear | 705/41 |
| 7,757,945 B2 | 7/2010 | Gray et al. | |
| 7,774,274 B2 * | 8/2010 | Jones et al. | 705/39 |
| 7,775,426 B2 | 8/2010 | Paul et al. | |
| 7,783,566 B2 | 8/2010 | Armes et al. | |
| 7,848,977 B2 * | 12/2010 | McCarthy et al. | 705/35 |
| 2002/0059146 A1 | 5/2002 | Keech | |
| 2002/0138428 A1 | 9/2002 | Spear | |
| 2002/0156689 A1 | 10/2002 | Spalding | |
| 2003/0088462 A1 * | 5/2003 | Carrithers et al. | 705/14 |
| 2003/0204470 A1 * | 10/2003 | Manchester et al. | 705/39 |
| 2004/0030645 A1 | 2/2004 | Monaghan | |
| 2004/0054622 A1 * | 3/2004 | Strayer et al. | 705/39 |
| 2004/0107125 A1 | 6/2004 | Guheen et al. | |
| 2004/0117300 A1 * | 6/2004 | Jones et al. | 705/39 |
| 2004/0186773 A1 * | 9/2004 | George et al. | 705/14 |
| 2004/0236682 A1 * | 11/2004 | Strayer et al. | 705/39 |
| 2004/0249749 A1 * | 12/2004 | Strayer et al. | 705/39 |
| 2005/0027543 A1 | 2/2005 | Labrou et al. | |
| 2005/0035192 A1 * | 2/2005 | Bonalle et al. | 235/379 |
| 2005/0234817 A1 * | 10/2005 | VanFleet et al. | 705/40 |
| 2005/0246278 A1 | 11/2005 | Gerber et al. | |
| 2006/0116954 A1 * | 6/2006 | Strayer et al. | 705/39 |
| 2006/0116955 A1 * | 6/2006 | Strayer et al. | 705/39 |
| 2006/0208065 A1 | 9/2006 | Mendelovich et al. | |
| 2006/0229974 A1 | 10/2006 | Keithley et al. | |
| 2006/0253390 A1 * | 11/2006 | McCarthy et al. | 705/39 |
| 2007/0012759 A1 | 1/2007 | Allarea et al. | |
| 2007/0051797 A1 * | 3/2007 | Randolph-Wall et al. | 235/381 |
| 2008/0005018 A1 * | 1/2008 | Powell | 705/39 |
| 2008/0040610 A1 | 2/2008 | Fergusson | |
| 2008/0249938 A1 | 10/2008 | Drake-Stoker | |
| 2008/0288396 A1 * | 11/2008 | Siggers et al. | 705/39 |
| 2009/0006262 A1 * | 1/2009 | Brown et al. | 705/64 |
| 2009/0076956 A1 | 3/2009 | Bishop et al. | |
| 2009/0090783 A1 * | 4/2009 | Killian et al. | 235/492 |
| 2009/0094123 A1 * | 4/2009 | Killian et al. | 705/16 |
| 2009/0094125 A1 * | 4/2009 | Killian et al. | 705/17 |
| 2009/0094126 A1 * | 4/2009 | Killian et al. | 705/17 |
| 2009/0164380 A1 | 6/2009 | Brown | |
| 2010/0030687 A1 | 2/2010 | Panthaki et al. | |
| 2010/0049651 A1 * | 2/2010 | Lang et al. | 705/38 |
| 2010/0153199 A1 * | 6/2010 | Ahmad | 705/14.17 |
| 2010/0211444 A1 * | 8/2010 | Spear | 705/14.15 |
| 2011/0029396 A1 * | 2/2011 | Sobek | 705/17 |
| 2011/0137799 A1 | 6/2011 | Persaud et al. | |

OTHER PUBLICATIONS

International Search Report and The Written Opinion of the International Searching Authority dated May 26, 2009, PCT/US09/39348 (10 pages).

* cited by examiner

METHODS AND SYSTEMS FOR MANAGING CO-BRAND PROPRIETARY FINANCIAL TRANSACTION PROCESSING

CROSS REFERENCE TO RELATED APPLICATIONS

This application claims the priority of Provisional Patent Application Ser. No. 61/042,585, filed Apr. 4, 2008, which is hereby incorporated by reference in its entirety.

BACKGROUND OF THE INVENTION

This invention relates generally to processing transactions associated with financial transaction card accounts and, more particularly, to network-based methods and systems for processing financial transactions using a co-brand proprietary financial transaction card through a multi-party payment card interchange and identifying whether the transaction should be processed as a proprietary private label transaction or as a network branded transaction.

At least some known merchants accept payment for goods and services using more than one type of financial transaction card systems. One type may be a multi-party transaction system where transactions are processed through a multi-party transaction system interchange. Another type may be a private label transaction system where merchants are directly communicatively coupled to a payment card issuer for transaction processing. Still another type may be a co-brand proprietary transaction system. For example, some merchants accept Visa®, MasterCard®, Discover®, and/or American Express® financial transaction cards. Some merchants also accept a private label financial transaction card, such as a Macy's®, Home Depot®, or other retail merchant card. Generally private label transaction systems are closed to transaction data being transmitted on the private label transaction systems that is not associated with a private label transaction. As such, less identification of the merchants and transaction information is required.

To facilitate processing, issuers may determine that switching their private label portfolio transactions and/or co-brand proprietary transactions through the multi-party transaction system interchange improves response times and/or cost benefits. Currently, merchants are typically directly connected to the issuers that manage the private label transactions originating from co-brand proprietary financial transaction cards, and the transactions are processed in a closed-loop manner. Because of the closed nature of their current private label processing environment, issuers know that the transactions they receive come from their co-brand partner's location (a participating merchant). However, with a multi-party transaction system interchange, issuers need to be able to determine if a transaction occurring on a co-brand proprietary transaction card is originating at a participating or non-participating merchant location to be able to properly direct each transaction for processing.

BRIEF DESCRIPTION OF THE INVENTION

In one embodiment, a computer-based method for processing a financial transaction using a co-brand proprietary payment card through a multi-party payment card interchange network is provided. The co-brand payment card is associated with a cardholder and a co-brand program. The co-brand program includes an issuer, a co-brand merchant partner, and the interchange network. The method includes storing within a database a list of merchants participating in a co-brand program with the interchange network, receiving at the interchange network an authorization request for the transaction involving the co-brand payment card wherein the authorization request received from an acquirer and includes a merchant identifier, determining whether the transaction originated at one of the participating merchants by comparing the received merchant identifier to the list of participating merchants stored within the database, manipulating at the interchange network the authorization request to include a private label identifier when the transaction is determined to have originated at one of the participating merchants, and transmitting an authorization response from the interchange network to the acquirer. The authorization response includes the private label identifier. The authorization response designates the transaction for processing as a private label transaction.

In another embodiment, a network-based system for processing a financial transaction using a co-brand proprietary payment card through a multi-party payment card interchange network is provided. The co-brand payment card is associated with a cardholder and a co-brand program. The co-brand program includes an issuer, a co-brand merchant partner, and the interchange network. The system includes an acquirer computer system, a database, and a server system configured to be coupled to the computer system and the database. The server system associated with the interchange network. The server system configured to store within the database a list of merchants participating in a co-brand program with the interchange network, receive from the acquirer computer system an authorization request for the transaction involving the co-brand payment card wherein the authorization request includes a merchant identifier, determine whether the transaction originated at one of the participating merchants by comparing the received merchant identifier to the list of participating merchants stored within the database, manipulate the authorization request to include a private label identifier when the transaction is determined to have originated at one of the participating merchants, and transmit an authorization response to the acquirer computer system, the authorization response including the private label identifier, the authorization response designating the transaction for processing as a private label transaction.

In another embodiment, a computer for processing a financial transaction using a co-brand proprietary payment card is provided. The computer is associated with a multi-party payment card interchange network. The co-brand payment card is associated with a cardholder and a co-brand program. The co-brand program includes an issuer, a co-brand merchant partner, and the interchange network. The computer having a memory and programmed to store within the memory a list of merchants participating in a co-brand program with the interchange network, receive an authorization request for the transaction involving the co-brand payment card wherein the authorization request is received from an acquirer and includes a merchant identifier, determine whether the transaction originated at one of the participating merchants by comparing the received merchant identifier to the list of participating merchants stored within the memory, manipulate the authorization request to include a private label identifier when the transaction is determined to have originated at one of the participating merchants, and transmit an authorization response to the acquirer. The authorization response includes the private label identifier. The authorization response designates the transaction for processing as a private label transaction.

In another embodiment, a computer program embodied on a computer readable medium for processing a financial transaction using a co-brand proprietary payment card and an interchange computer associated with a multi-party payment card interchange network is provided. The co-brand payment card is associated with a cardholder and a co-brand program. The co-brand program includes an issuer, a co-brand merchant partner, and the interchange network. The program is executed by the interchange computer and comprises at least one code segment that stores within a database a list of merchants participating in a co-brand program with the interchange network, receives an authorization request for the transaction involving the co-brand payment card wherein the authorization request is received from an acquirer and includes a merchant identifier, determines whether the transaction originated at one of the participating merchants by comparing the received merchant identifier to the list of participating merchants stored within the database, manipulates the authorization request to include a private label identifier when the transaction is determined to have originated at one of the participating merchants, and transmits an authorization response to the acquirer. The authorization response includes the private label identifier and designates the transaction for processing as a private label transaction.

In another embodiment, a method of processing a financial transaction using a co-brand proprietary payment card through a multi-party payment card interchange is provided. The payment card is associated with an issuer, a co-brand merchant partner, and a separate third party processor. The method includes storing in a database a list of participating merchants received from a payment card issuer wherein the database is associated with the multi-party payment card interchange, receiving an authorization request for a transaction involving a co-brand proprietary payment card wherein the authorization request received from a merchant acquirer, determining whether the transaction originated at a participating merchant location based on the list of participating merchants stored within the database, identifying in the authorization request whether the transaction originated at a participating merchant location, generating an authorization response code at the multi-party payment card interchange if the transaction originated at a participating merchant location, notifying the merchant acquirer if the transaction originated at a participating merchant location by transmitting an authorization response including the generated authorization response code for designating the transaction for processing as a proprietary private label transaction, and receiving clearing data at the multi-party payment system from the merchant acquirer for the transaction designated for processing as a proprietary private label transaction.

In another embodiment, a network-based system for processing a financial transaction initiated by a cardholder using a co-brand proprietary payment card for a multi-party payment card interchange is provided. The payment card is associated with a payment card issuer and a separate third party processor. The system includes a database for storing a list of participating merchants received from a payment card issuer, and a server system communicatively coupled to the database. The server system is configured to receive from a computer system associated with a merchant acquirer an authorization request for a transaction involving a co-brand proprietary payment card, determine whether the transaction originated at a participating merchant location by comparing received transaction data to the list of participating merchants stored within the database, identify in the authorization request whether the transaction originated at a participating merchant location, generate an authorization response code if the transaction originated at a participating merchant location, transmit an authorization response including the generated authorization response code to the merchant acquirer computer system if the transaction originated at a participating merchant location wherein the authorization response code designates the transaction for processing as a proprietary private label transaction, and receive clearing data from the merchant acquirer computer system for the transaction for further processing as a proprietary private label transaction.

In another embodiment, a method of processing a financial transaction using a co-brand proprietary payment card associated with a payment card issuer, a co-brand merchant partner and a separate third party processor through a multi-party payment card interchange includes submitting, by a merchant acquirer, all co-brand proprietary transactions received from merchant controlled input devices for authorization as a default third party processor branded transaction. The method further includes determining if the co-brand proprietary card associated with the transaction was used at a participating merchant location and identifying in the authorization request those transactions on a co-brand proprietary card that were used at a participating merchant location. Additionally, the method includes notifying the merchant acquirer which transactions to submit for processing as proprietary private label transactions in an authorization response code and receiving the authorization response code by at least one of the acquirer and the merchant controlled input device. The method also includes determining by the merchant acquirer during clearing whether approved transactions meet predetermined criteria for submission as proprietary private label and submitting all co-brand proprietary transactions into the four-party payment system with appropriate product code for clearing.

In another embodiment, a network-based system for processing a financial transaction in a cardholder-initiated financial transaction using a multi-party payment card interchange that includes co-branded and private label cards, and co-brand merchants, private label merchants, and combinations thereof is provided. The system includes a database for storing information and a server system communicatively coupled to the database wherein the server system is configured to receive data from merchant controlled input devices located at the co-brand merchants and the private label merchants. The server is further configured to receive at least one of branded and private label financial transaction information using a co-brand proprietary card from a merchant acquirer associated with the merchant from which the financial transaction information was received and determine if the received at least one of branded and private label financial transaction information originated at a participating private label merchant. The server is further configured to transmit the received financial information to an associated payment card issuer if the received financial transaction information originated at a participating merchant, if not the server is configured to transmit the received financial information to an associated third party processor issuer.

BRIEF DESCRIPTION OF THE DRAWINGS

FIG. 1 is a schematic diagram of an exemplary private label card account payment environment that includes a point of interaction controlled by a private label merchant, a card issuer or issuing bank, and a transaction processor interconnecting point of interaction and card issuer.

FIG. 2 is a schematic diagram illustrating an exemplary multi-party payment card industry system for enabling ordinary payment-by-card transactions in which merchants and card issuers do not necessarily have a one-to-one relationship.

FIG. 3 is a simplified block diagram of an exemplary system in accordance with one embodiment of the present invention.

FIG. 4 is an expanded block diagram of an exemplary embodiment of a server architecture of a system in accordance with one embodiment of the present invention.

FIG. 5 is a flow diagram of a method of using account level management (ALM) functionality to support the acquirer to appropriately process transactions originating on a co-brand proprietary card in accordance with an exemplary embodiment of the present invention.

FIG. 6 is a flow diagram of a method of authorization processing using a co-brand proprietary transaction management service in accordance with an exemplary embodiment of the present invention.

FIG. 7 is a flow diagram of an exemplary method of determining if a merchant is a valid participating merchant for private label or co-brand processing.

FIG. 8 is a more detailed flow diagram of an exemplary method of determining if a merchant is a valid participating merchant for private label or co-brand processing.

DETAILED DESCRIPTION OF THE INVENTION

Figure 1:
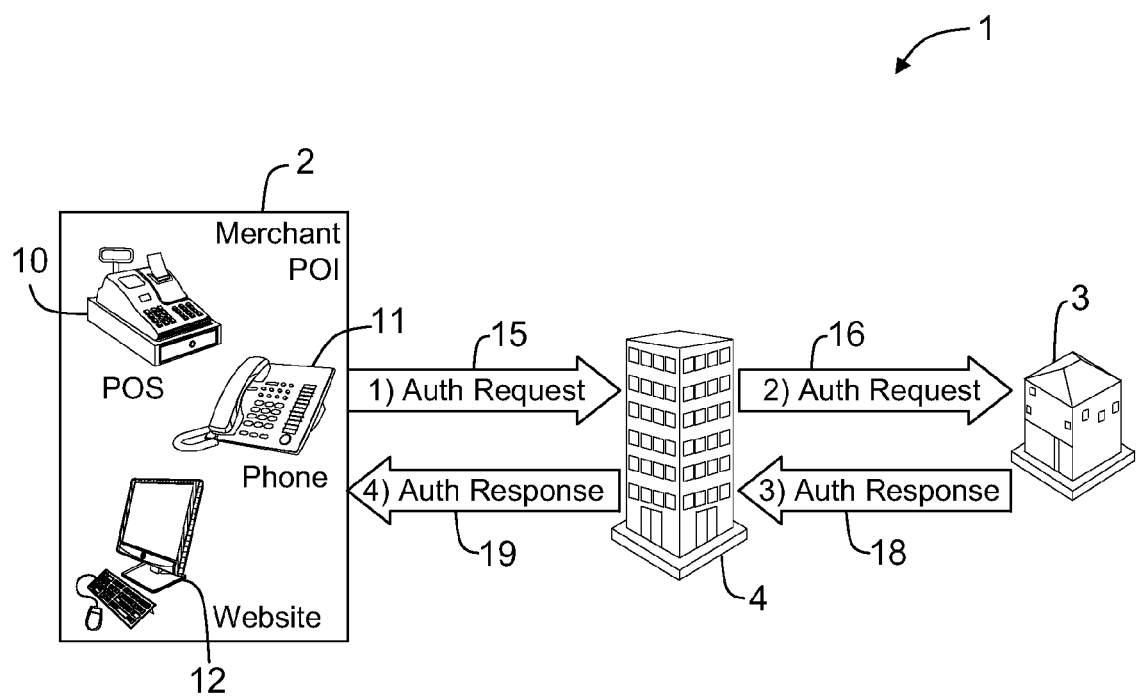
FIGS. 1-8 show exemplary embodiments of the methods and systems described herein.

Embodiments of the present invention enable issuers and their merchants to eliminate the closed-loop processing infrastructure they once maintained for managing the private label transactions originating from co-brand proprietary cards. The network-processing model for co-brand proprietary card transactions, enabled by the third party processor private label program, is able to uniquely support the processing of both branded and private label transactions that occur on a co-brand proprietary card through the four-party payment system. Merchants can now direct both the branded and private label activity occurring on a co-brand proprietary card to their merchant acquirer for further routing to third party processor rather than having to route the private label transactions through a closed-loop processing model to the issuer and the third party processor branded transactions to their merchant acquirer.

However, enabling merchants and issuers to switch all of their co-brand proprietary program transactions through the four-party payment system presents merchant acquirers with unique challenges. When a co-brand proprietary card is used at the co-brand partner's location (participating merchant), the transaction should be processed as a proprietary private label transaction and adhere to third party processor's private label product construct and rules. When the transaction occurs at a location other than the participating merchant's location, the transaction should be processed as a third party processor branded transaction and adhere to all applicable third party processor rules and bylaws.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, a co-brand proprietary transaction card (also referred to as a co-brand card or co-brand transaction card) is a payment card that can be used at a co-brand partner's location (participating merchant) wherein the transaction is then processed as a proprietary private label transaction. The co-brand card can also be used by the cardholder at a non co-brand partner's location when that non co-brand partner is registered with the third party interchange network. Co-branded cards are oftentimes designed with the participating merchant's company brand as the dominant brand represented on the face of the card but may also contain the logo of the third-party interchange network (e.g., MasterCard®) and the name of the issuing bank. Co-branding is a partnership between the interchange network, the participating merchant, and a card issuer that can result in increased card usage, higher spending levels, efficient marketing opportunities, and higher satisfaction and value for customers. In one embodiment described herein, the co-brand payment card is associated with a single co-brand merchant partner. The single co-brand merchant partner may be a single business entity having multiple points of sale or multiple locations. The co-brand payment card is then configured to allow the cardholder to initiate private label transactions at any of the points of sale of the single co-brand merchant partner or initiate non-private label transactions with merchants other than the single co-brand merchant partner that are registered with the interchange network. In another embodiment described herein, the co-brand payment card is associated with a coalition of co-brand merchant partners. The coalition of co-brand merchant partners includes a plurality of merchant partners wherein each merchant partner is a separate business entity. Each of these separate merchant partners may have multiple point of sale or multiple locations. The co-brand payment card is then configured to allow the cardholder to initiate private label transactions at any of the coalition merchant partners or initiate non-private label transactions with merchants other than the coalition merchant partners that are registered with the interchange network.

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed-loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
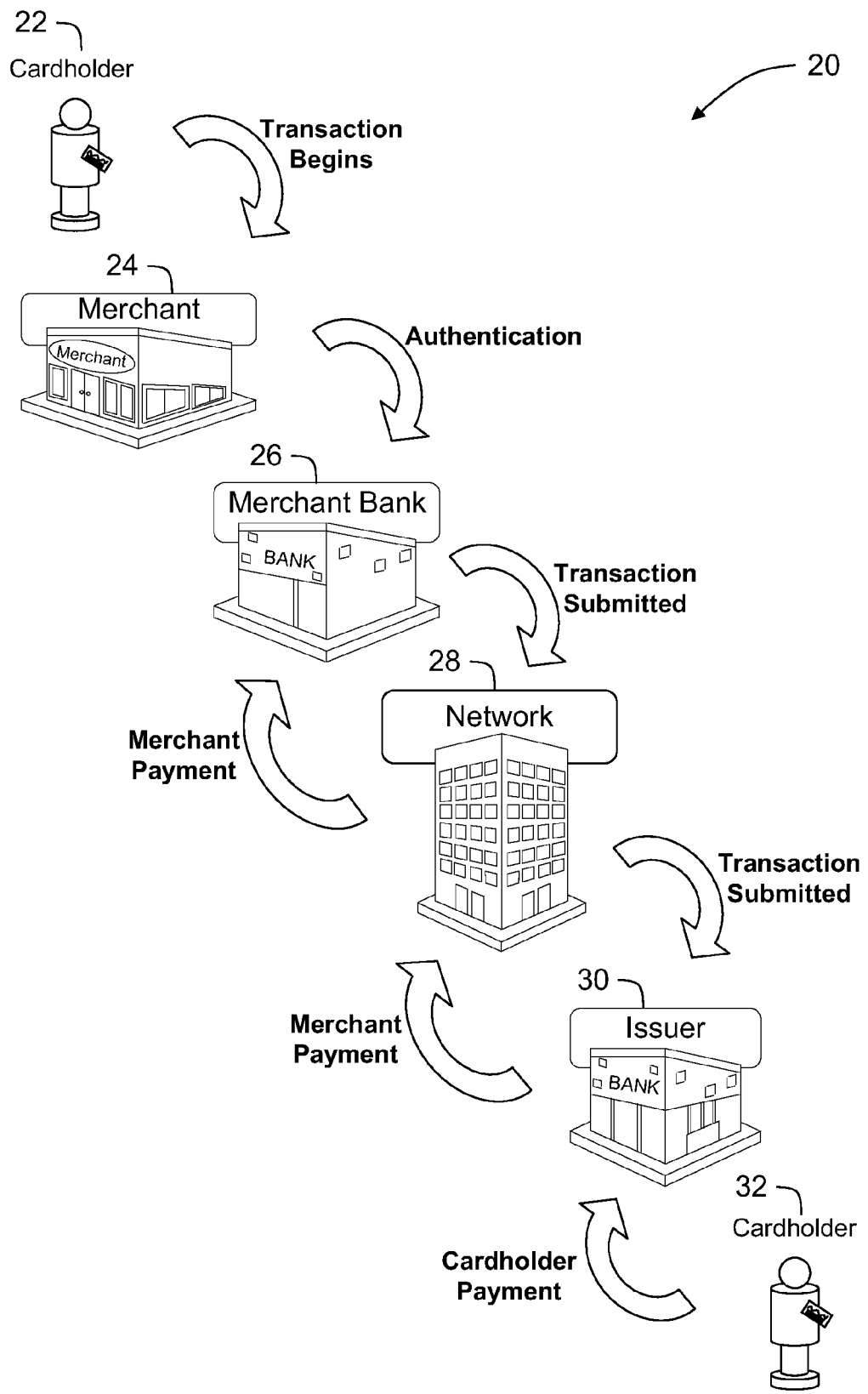

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
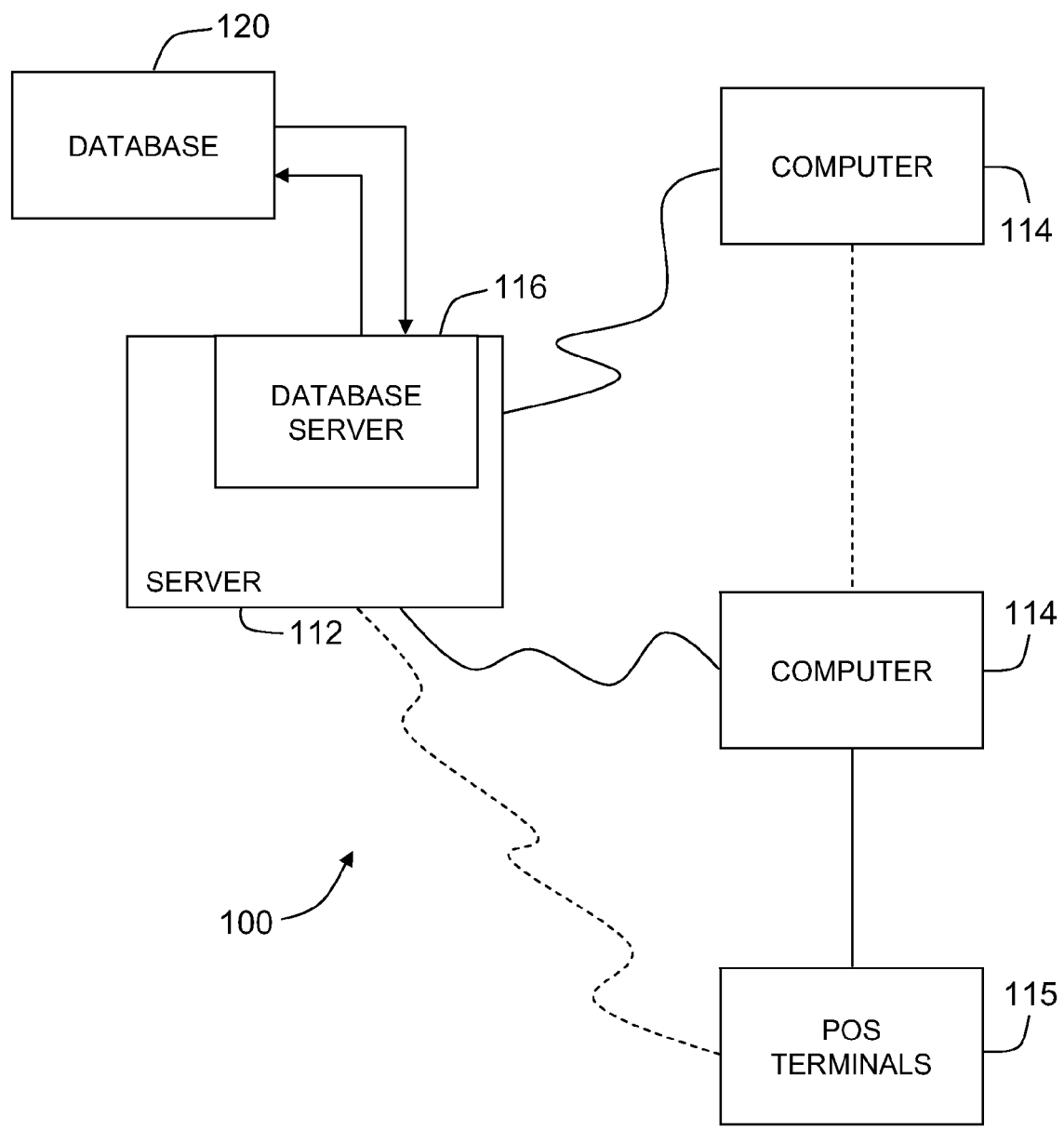

FIG. 3 is a simplified block diagram of an exemplary system 100 in accordance with one embodiment of the present invention. System 100 is a payment card system, which can be utilized by account holders as part of a process of initiating an authorization request and transaction as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store data relating to a list of merchants participating in co-brand programs with the interchange network; account data including data representing a plurality of accounts registered with the network interchange wherein the plurality of accounts include co-brand accounts and non co-brand accounts, each of the plurality of accounts having a cardholder, a payment card and an account number associated therewith, the account data further including a co-brand identifier associated with each payment card designated as a co-brand payment card; interchange rate data for different types of transactions performed over the interchange network; and rewards program data for different rewards programs offered by the issuer or the interchange network.

In the example embodiment, one of client systems 114 may be associated with an acquirer while another one of client systems 114 may be associated with an issuer, POS terminal 115 may be associated with a participating merchant, and server system 112 may be associated with the interchange network.

Figure 4:
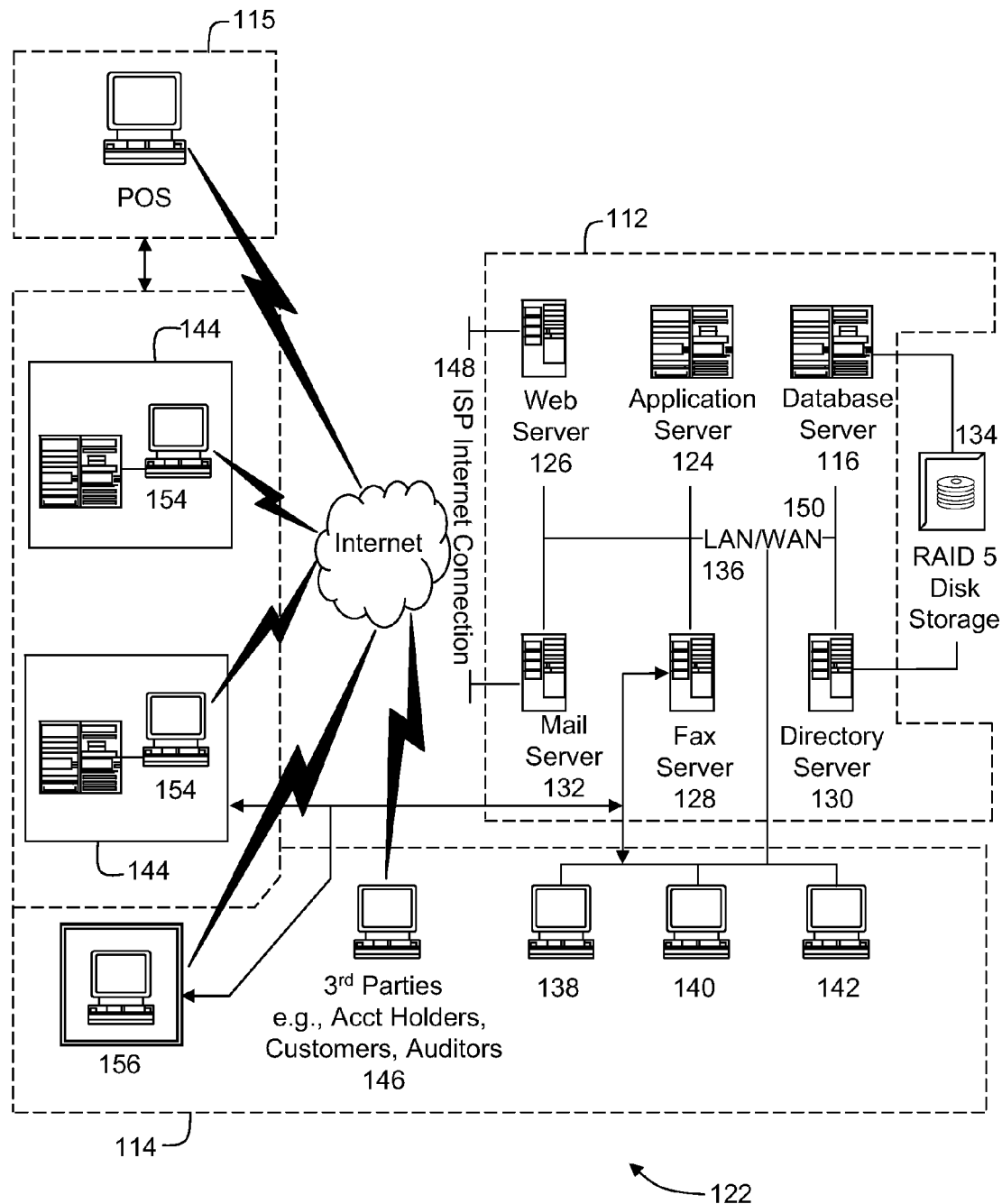

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, and POS terminals 115. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
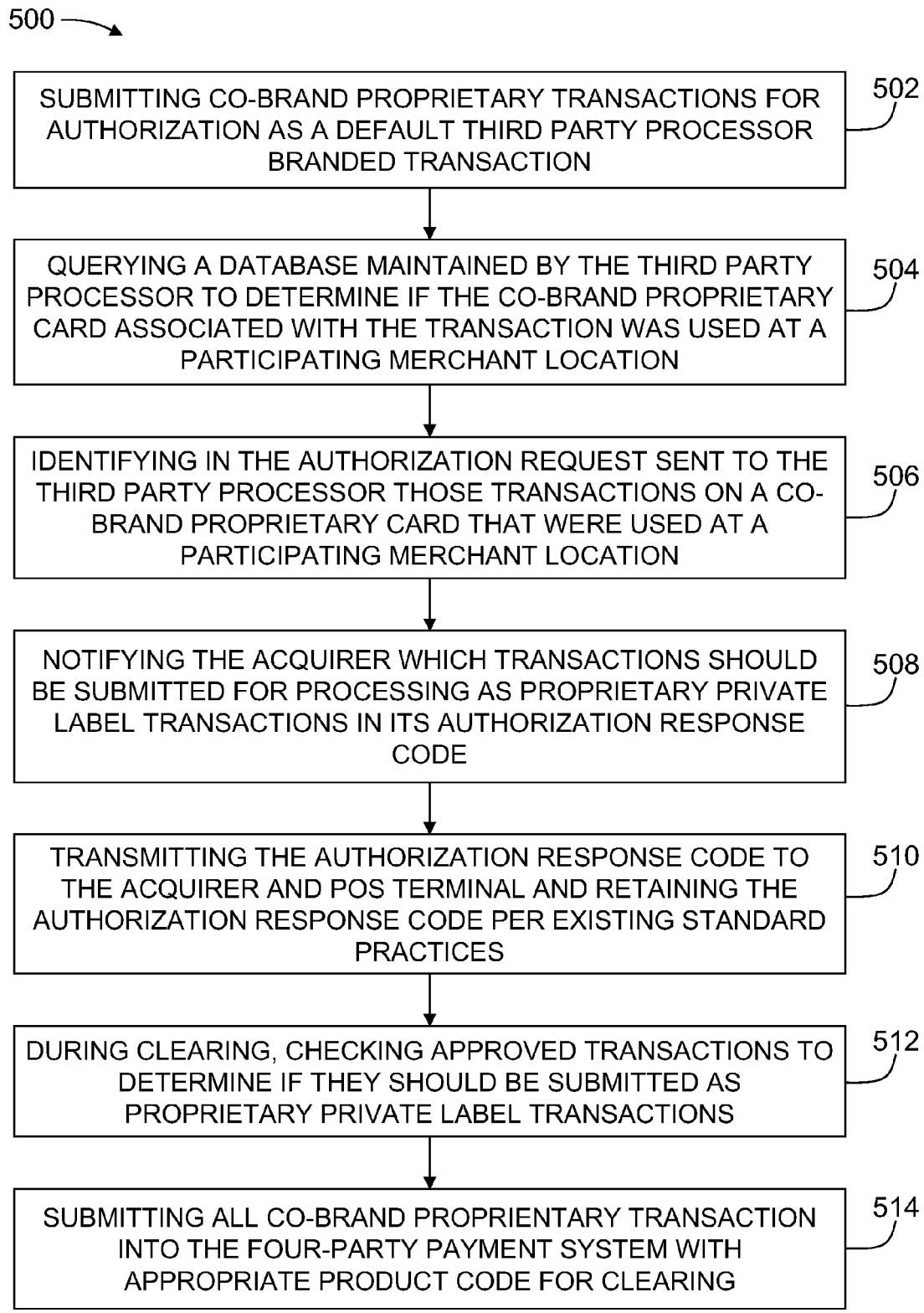

FIG. 5 is a flow diagram of a method 500 of using ALM functionality to support the acquirer to appropriately process transactions originating on a co-brand proprietary card in accordance with an exemplary embodiment of the present invention.

To ensure proper transaction processing and product construct adherence, acquirers must correctly identify a transaction as being a proprietary private label transaction when a co-brand proprietary card is used at the partner merchant's location. Currently, acquirers are not equipped to make the determination of what should be processed as a third party processor branded transaction versus a proprietary private transaction.

To facilitate an acquirer in determining whether to submit the transaction into clearing as a branded transaction or a private label transaction, a third party processor leverages an existing Account Level Management (ALM) functionality to facilitate correctly identifying a transaction as being a third party processor branded transaction or a proprietary private label transaction when a co-brand proprietary card is used.

A method using ALM functionality to support the acquirer to appropriately process transactions originating on a co-brand proprietary card includes submitting 502, by the merchant acquirer, all co-brand proprietary transactions for authorization as a default third party processor branded transaction. The authorization system queries 504 a database maintained by the third party processor (also referred to as the interchange network) to determine if the co-brand proprietary card associated with the transaction was used at a participating merchant location. The authorization system then identifies 506 in the authorization request sent to the third party processor those transactions on a co-brand proprietary card that were used at a participating merchant location. The third party processor notifies 508 the acquirer which transactions should be submitted for processing as proprietary private label transactions in its authorization response code. The authorization response code is transmitted 510 back to the acquirer and POS terminal and is retained by the acquirer per existing standard practices. During clearing, the acquirer checks 512 approved transactions to determine if they should be submitted as proprietary private label transactions. The acquirer submits 514 all co-brand proprietary transactions into the four-party payment system with appropriate product code for clearing.

Figure 6:
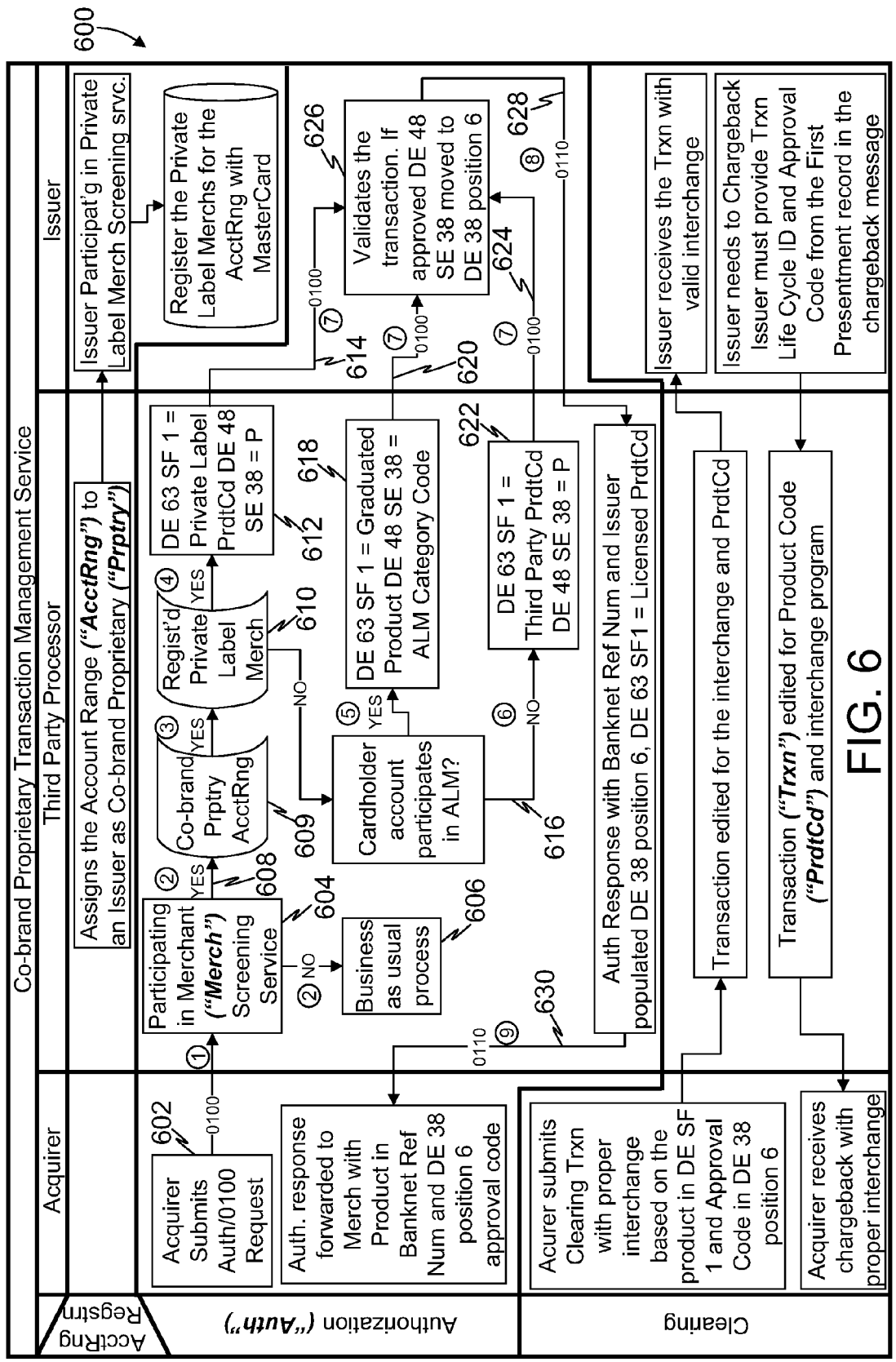

FIG. 6 is a flow diagram of a method 600 of authorization processing using a co-brand proprietary transaction management service in accordance with an exemplary embodiment of the present invention. In the exemplary embodiment, a co-brand proprietary card program permits members to use third party processor BINs (Bank Identification Numbers) for the card product that can be private label and third party processor brand. For transactions originating from co-brand proprietary cards, the co-brand proprietary transaction management service seamlessly determines whether the transaction occurred at the co-brand partner's merchant location, and if so, places the appropriate private label product code in the authorization request (0100) message before routing the transaction to the issuer. The co-brand proprietary account range must participate in the private label merchant screening service. Cardholder accounts within the co-brand proprietary card program may optionally participate in account level management.

Acquirers analyze a DE 38 (Authorization ID Response), position 6 for an account category code value and DE 63 (Network Data), subfield 1 (Financial Network Code) in the authorization request response (0110) message to determine how to submit the transaction to clearing.

Method 600 includes sending 602, by the acquirer, an authorization request (0100) message to the authorization system. The authorization system determines 604 if the account range associated to the cardholder account participates in the private label merchant screening service. If the account range does not participate in private label merchant screening, the authorization system forwards 606 the message to the issuer for approval as business-as-usual. If the account range participates 608 in private label merchant screening, the authorization system determines 609 if the account range is set up as a co-brand proprietary card and determines 610 if the merchant is a registered private label merchant.

The authorization system validates 612 the merchant in card acceptor ID code (DE 42) or third party processor assigned ID (DE 48, sub-element 38) to ensure that transaction took place at a participating private label merchant location. If the participating private label merchant is validated against the merchant registration database, the authorization system populates DE 63 (Network Data), subfield 1 (Financial Network Code) with the private label product code and DE 48 (Additional Data—Private Use), sub-element 38 (Account Category) with value P (Account qualifies for third party processor product graduation or co-brand proprietary card program). The authorization request (0100) message is forwarded 614 to issuer for approval.

If the transaction cannot be validated at the co-brand partner's merchant location, the authorization system determines 616 if the cardholder account participates in account level management. If yes, the authorization system populates 618 DE 63, subfield 1 and DE 48, sub-element 38 according to account level management processing. The authorization request (0100) message is forwarded 620 to issuer for approval.

If transaction does not occur at a private label merchant location and the cardholder account does not participate in account level management, the authorization system forwards 622 the transaction to the issuer with DE 63, subfield 1 third party processor brand product code associated to the account range and DE 48, sub-element 38=P. The authorization request (0100) message is forwarded 624 to issuer for approval.

The issuer validates 626 the transaction. Issuers that participate in the co-brand proprietary card program or account level management receive the account category value in DE 48 (Additional Data—Private Use), sub-element 38 (Account Category) of the authorization request (0100) message.

The account category value P indicates the cardholder account participates in either product graduation or co-brand card program. The issuer transmits 628 the transaction to the authorization system with the response code. If the transaction is approved, the issuer moves the value in DE 48, sub-element 38 to DE 38, position 6 of the authorization response (0110) message.

The Authorization System forwards 630 the authorization request response (0110) message to the acquirer containing DE 63, subfield 1 with the licensed product code and DE 48, sub-element 38, position 6 containing a value. If DE 48, sub-element 38 was present in the authorization request (0100) message, the issuer must place the value in DE 38, position 6 approval code. A failure to include the category code in DE 38, position 6 on the approved authorization will cause the authorization request to be routed to and processed by a stand-in system.

Accordingly, in the case of a co-brand proprietary card, if the card is used at the co-brand partner's location, the transaction should be processed as a proprietary private label transaction but when the transaction occurs at a location other than the co-brand partner's location, the transaction should be processed as a third party processor branded transaction.

Co-brand proprietary card account ranges are uniquely identified by the assignment of the card program identifier (CPI) of a merchant category classification (MCC) code in priority 1 and PVL in priority 2. Since the CPI in Priority 1 is used to determine the default processing instructions, acquirers must submit proprietary private label transactions with a CPI of PVL. Alternatively, acquirers may submit IRD 57 with the proprietary private label transactions and GCMS will derive the CPI of PVL.

To ensure proper processing of co-brand proprietary cards, acquirers must correctly identify a transaction as being a private label transaction when a co-brand proprietary card is used at the merchant partner's location. Then they must submit IRD 57 with each proprietary private label transaction they identify.

Figure 7:
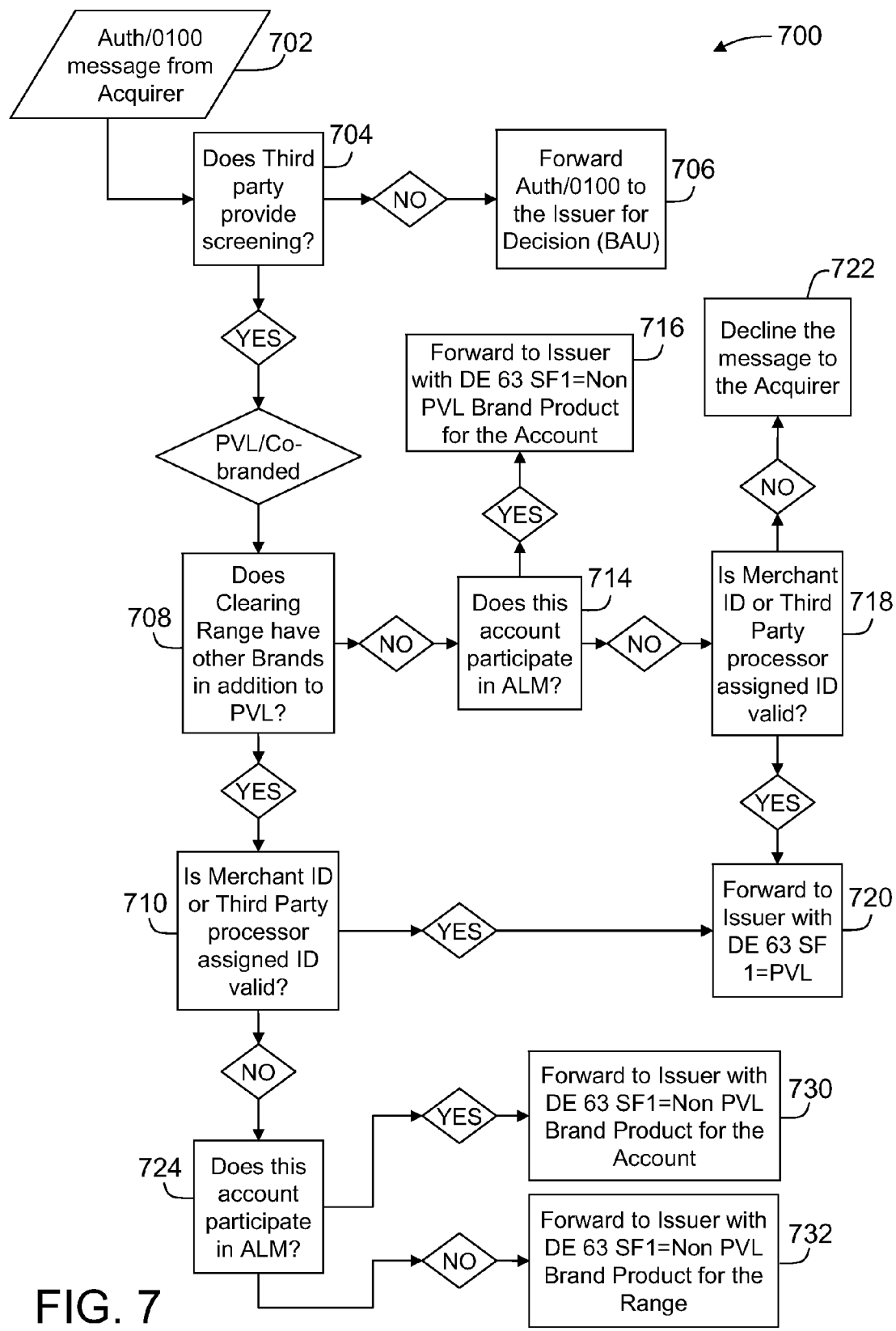

FIG. 7 is a flow diagram of an exemplary method 700 of determining if a merchant is a valid participating merchant for private label or co-brand processing. In the exemplary embodiment, the authorization system receives 702 a new authorization (0100) message from an acquirer. The authorization system checks 704 the new service code at the authorization account range processing service to determine if the third party processor will be performing the merchant screening service or not. The merchant screening is performed only on authorization (0100) messages.

If the third party processor does not provide the merchant screening service, then BAU (business as usual) process applies 706. If the third party processor provides the merchant screening service then the clearing issuer account range brand product extract is checked 708 to determine if the range is co-branded (this can be identified by clearing range associated to other brands in addition to PVL) or not. If authorization (0100) message contains both the third party processor assigned ID and merchant ID, then merchant ID takes precedence over the third party processor assigned ID.

If the clearing range only has brand product for PVL acceptance brand (CPI) associated or range has PVL and CIR acceptance brand, and co-brand indicator is not set then: (a) If it is an ATM transaction (processing code is 01), forward 710 to the Issuer using brand product CIR in DE63 SF1 (if clearing range has CIR) else reject the transaction with DE39=58 and DE 44=DE 3; (b) If it is not an ATM transaction then determine 714 if account participates in Account Level Management (ALM). If the account participates in ALM populate 716 DE48 SE 38 with "M" or "P" as per current ALM logic and DE63 SF1 will contain the graduated product; (c) If the account does not participate in ALM and is NOT an ATM transaction then validate 718 the third party processor assigned ID or merchant ID in merchant screening table.

If Merchant ID in DE 42, combination, or third party processor assigned ID in DE48 SE32 finds a match for the account, forward 720 to the issuer using brand product for the PVL acceptance brand in DE63 SF1.

If the merchant ID in DE 42, combination and third party processor assigned ID in DE48 SE32 for the account does not match and processing code is not 01 then decline 722 the transaction back to acquirer with DE 39 response code of 58.

If the range is identified as co-branded then:
(a) If it is ATM transaction (processing code is 01), forward to the issuer using brand product CIR in DE63 SF1 (if clearing range has CIR) else reject the transaction with DE39=58 and DE 44=DE 3. DE48 SF38 will contain "P." Forward the transaction to the issuer for authorization.

(b) If it is not an ATM transaction, look at the card acceptor ID (Merchant ID) in DE 42, or third party processor assigned ID in DE48 SE38 for the account to find a match on the table. If match is found, then populate PVL in DE63 SF1. DE48 SF38 will contain "P." Forward 720 the transaction to the issuer for authorization.

(c) If it is not an ATM transaction and merchant ID or third party processor assigned ID for the account does not find a match, then determine 724 if account participates in Account Level Management (ALM). If the account participates in ALM assign the graduated product code in DE63SF1. DE48 SF38 will contain "P" or "M" as per current ALM logic. Forward 730 the transaction to the issuer for authorization.

(d) If it is not an ATM transaction and match on merchant ID or third party processor assigned ID is not found and account does not participate in product graduation, assign the non PVL, non CIR clearing issuer account range product code according to the brand priority in DE63SF1. DE48 SF38 will contain "P." Forward 732 the transaction to the issuer for authorization.

Figure 8:
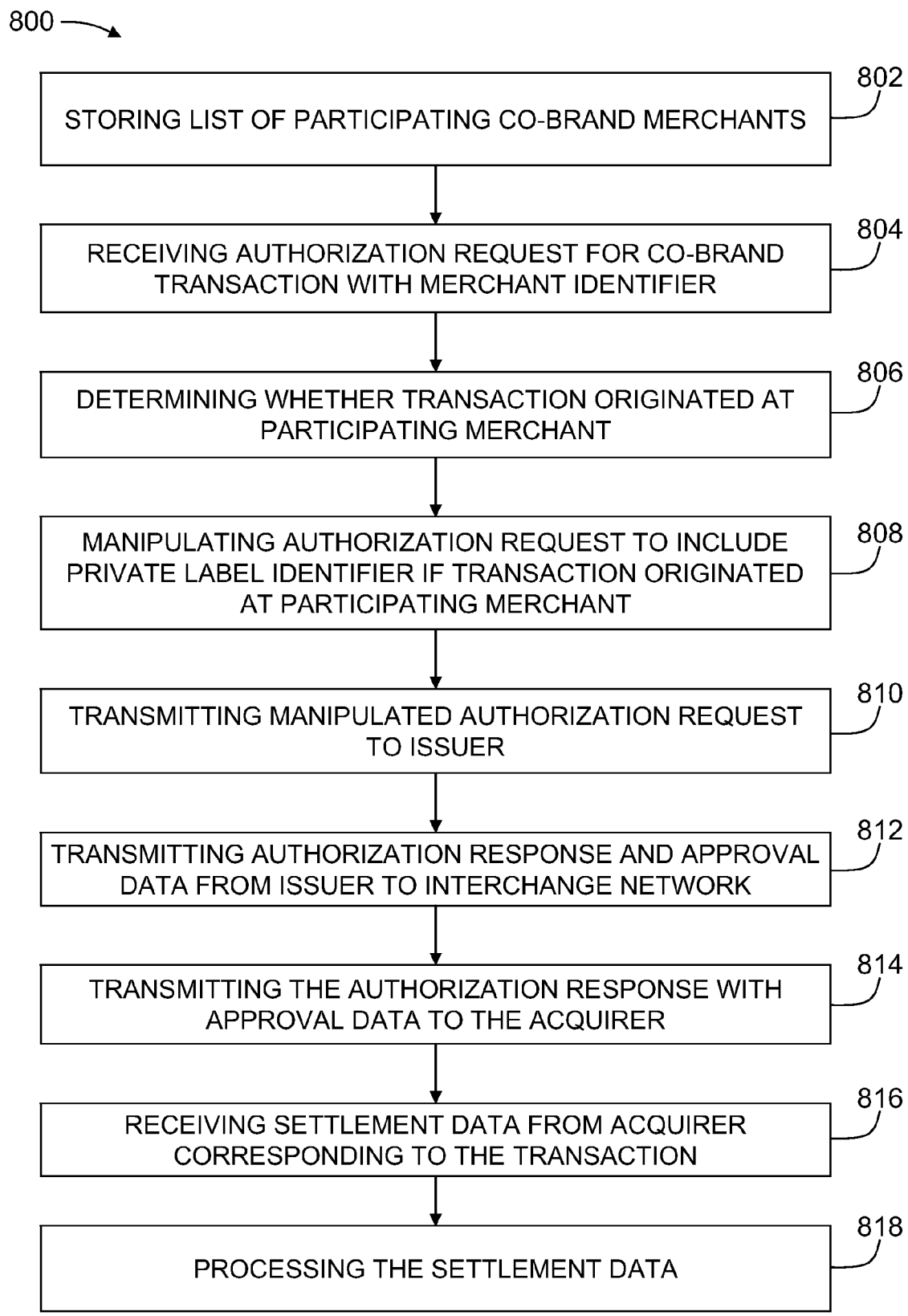

FIG. 8 is a more detailed flow diagram of an exemplary method 800 of determining if a merchant is a valid participating merchant for private label or co-brand processing. In the example embodiment, system 100 facilitates processing a financial transaction using a co-brand proprietary payment card over a multi-party payment card interchange network server system 112. The co-brand payment card is associated with a cardholder and a co-brand program. The co-brand program is a partnership involving an issuer, a co-brand merchant partner, and the interchange network. The processing is achieved by system 100 performing the steps of method 800. More specifically, the technical effect of the systems and methods described herein is achieved by storing 802 within database 120 a list of merchants participating in a co-brand program with the interchange network. In addition to storing 802 the list of merchants, account data may also be stored within database 120. The account data includes data representing a plurality of accounts registered with the network interchange wherein the plurality of accounts includes co-brand accounts and non co-brand accounts. Each of the plurality of accounts has a cardholder, a payment card and an account number associated therewith. The account data further includes a co-brand identifier associated with each payment card designated as a co-brand payment card.

After storing 802, interchange server system 112 receives 804 an authorization request for the transaction involving the co-brand payment card wherein the authorization request is received from an acquirer and includes a merchant identifier, and determines 806 whether the transaction originated at one of the participating merchants by comparing the received merchant identifier to the list of participating merchants stored within database 120.

In one embodiment, server system 112 also stores account numbers for each co-brand payment cards registered with the interchange network. These co-brand cards have a co-brand identifier associated therewith so that server system 112 is able to determine from the received authorization request whether the transaction was initiated using a co-brand payment card. In other words, when a payment card is used to initiate a transaction, server system 112 may first determine from the authorization request whether the card is a co-brand card, and then second determine whether the transaction was initiated at a participating merchant location.

System 112 manipulates 808 the authorization request to include a private label identifier when the transaction is determined to have originated at one of the participating merchants, and transmits 810 the manipulated authorization request to the issuer. The issuer, after determining that the cardholder has sufficient funds to complete the transaction, transmits 812 an authorization response with approval data to system 112. System 112 then transmits 814 the authorization response with approval data on to the acquirer for approving the transaction. The authorization response includes the private label identifier wherein the authorization response designates the transaction for processing as a private label transaction. The acquirer maintains this information until sending settlement data to server system 112. System 112 receives 816 the settlement data from the acquirer corresponding to the transaction. The settlement data includes the private label identifier for identifying the settlement data for processing as a private label transaction. The settlement data represents monetary funds being transferred between the issuer, the acquirer and the participating merchant for completing the transaction. System 112 processes 818 the settlement data including determining a private label interchange rate for the private label transaction, and generating rewards program data for the private label transaction when the private label transaction is eligible for a private label rewards program. If system 112 determines that the transaction is not initiated with a co-brand card or if the transaction is not performed at a participating merchant, then system 112 process the transaction as a normal business as usual transaction and not a private label transaction.

As will be appreciated based on the foregoing specification, the above-described embodiments of the disclosure may be implemented using computer programming or engineering techniques including computer software, firmware, hardware or any combination or subset thereof, wherein the technical effect of the systems and methods described herein is achieved by creating a secure application for processing a financial transaction using a co-brand proprietary payment card associated with a payment card issuer and a separate third party processor through a multi-party payment card interchange. The technical effect is also achieved by determining if submitted financial transaction information is associated with a merchant participating in a private label transaction system and identifying the participation in an authorization request. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of identifying valid private label transactions provides a cost-effective and reliable means for processing a financial transaction using a co-brand proprietary payment card associated with a payment card issuer and a separate third party processor through a multi-party payment card interchange. More specifically, the methods and systems described herein facilitate determining whether the co-brand proprietary payment card was used at a participating merchant location, and as such, should be processed as a proprietary private label transaction. In addition, the above-described methods and systems facilitate an automated identification and tracking of financial transaction information according to the merchant participation in a co-brand or private label program. As a result, the methods and systems described herein facilitate routing financial transaction information enabling issuers to identify when a private label transaction processed by a multi-party transaction card network originated at a participating or non-participant merchant location in a cost-effective and reliable manner.

While the disclosure has been described in terms of various specific embodiments, it will be recognized that the disclosure can be practiced with modification within the spirit and scope of the claims.

What is claimed is:

1. A computer-based method for processing a financial transaction using a co-brand proprietary payment card through a multi-party payment card interchange network, the co-brand payment card is associated with a cardholder and a co-brand program, the co-brand program including an issuer, a co-brand merchant partner, and the interchange network, said method comprising:

storing within a computer database a list of merchants participating in the co-brand program with the interchange network and an account range associated with a private label merchant screening service;

receiving at an interchange network computer an authorization request for the financial transaction involving the co-brand payment card, the authorization request received from an acquirer and including a merchant identifier and an account number associated with the co-brand payment card;

determining, by the interchange network computer, whether the account number associated with the co-brand payment card is within the account range associated with the private label merchant screening service;

determining, by the interchange network computer, whether the transaction originated at one of the participating merchants by comparing the received merchant identifier to the list of participating merchants stored within the database upon the determination by the interchange network computer that the account number associated with the co-brand payment card is within the account range associated with the private label merchant screening service;

manipulating at the interchange network computer the authorization request received from the acquirer to include a private label identifier upon the determination by the interchange network computer that the transaction originated at one of the participating merchants; and transmitting an authorization response from the interchange network computer to the acquirer after receiving the authorization response from an issuer, the authorization response including the private label identifier, the authorization response designating the transaction for processing as a private label transaction, the private label identifier used for clearing and settling the transaction.

2. A computer-based method according to claim 1 wherein storing within a database further comprises:

storing account data within the database, the account data including data representing a plurality of accounts registered with the network interchange, the plurality of accounts including co-brand accounts and non co-brand accounts, each of the plurality of accounts having a cardholder, a payment card and an account number associated therewith, the account data further including a co-brand identifier associated with each payment card designated as a co-brand payment card.

3. A computer-based method according to claim 2 wherein receiving at the interchange network an authorization request further comprises:

determining from the received authorization request that the transaction was initiated using one of the co-brand payment cards by detecting the co-brand identifier associated with the co-brand payment card used in the transaction.

4. A computer-based method according to claim 1 wherein manipulating at the interchange network the authorization request to include a private label identifier further comprises:

populating a product code data field included with the authorization request with the private label identifier.

5. A computer-based method according to claim 4 further comprising:

transmitting the authorization request with the private label identifier to the issuer; and receiving at the interchange network the authorization response generated by the issuer, the authorization response including the private label identifier and approval data, wherein the approval data includes confirmation from the issuer that the cardholder has sufficient funds to settle the transaction.

6. A computer-based method according to claim 1 wherein transmitting an authorization response from the interchange network to the acquirer further comprises:

transmitting the authorization response with the private label identifier from the interchange network to the acquirer, wherein the authorization response is further transmitted to the participating merchant to approve the transaction, and wherein the authorization response instructs the acquirer to designate the transaction as a private label transaction.

7. A computer-based method according to claim 1 further comprising:

receiving settlement data from the acquirer corresponding to the transaction, the settlement data including the private label identifier for identifying the settlement data for processing as a private label transaction, wherein the settlement data represents monetary funds being transferred between the issuer, the acquirer and the participating merchant for completing the transaction.

8. A computer-based method according to claim 7 further comprising:

determining at the interchange network that the settlement data received from the acquirer is identified as being associated with a private label transaction;

determining a private label interchange rate for the private label transaction; and processing the private label transaction at the interchange network at the private label interchange rate.

9. A computer-based method according to claim 7 further comprising:

determining at the interchange network that the settlement data received from the acquirer is identified as being associated with a private label transaction;

generating rewards program data for the private label transaction when the private label transaction is eligible for a private label rewards program; and transmitting the settlement data along with the rewards program data to the issuer for processing.

10. A computer-based method according to claim 1 wherein the co-brand payment card is associated with a single co-brand merchant partner, the single co-brand merchant partner being a single business entity having multiple points of sale, the co-brand payment card configured to allow the cardholder to initiate private label transactions at any of the points of sale of the single co-brand merchant partner or initiate non-private label transactions with merchants other than the single co-brand merchant partner that are registered with the interchange network.

11. A computer-based method according to claim 1 wherein the co-brand payment card is associated with a coalition of co-brand merchant partners, the coalition of co-brand merchant partners including a plurality of merchant partners each merchant partner being a separate business entity, the co-brand payment card configured to allow the cardholder to initiate private label transactions at any of the coalition merchant partners or initiate non-private label transactions with merchants other than the coalition merchant partners that are registered with the interchange network.

12. A network-based system for processing a financial transaction using a co-brand proprietary payment card through a multi-party payment card interchange network, the co-brand payment card is associated with a cardholder and a co-brand program, the co-brand program including an issuer, a co-brand merchant partner, and the interchange network, said system comprising:
   a database; and
   an interchange network server system configured to be in communication with the database and an acquirer computer system, said interchange network server system configured to:
   store within the database a list of merchants participating in a co-brand program with the interchange network and an account range associated with a private label merchant screening service;
   receive from the acquirer computer system an authorization request for the financial transaction involving the co-brand payment card, the authorization request including a merchant identifier and an account number associated with the co-brand payment card;
   determine whether the account number associated with the co-brand payment card is within the account range associated with the private label merchant screening service;
   determine whether the transaction originated at one of the participating merchants by comparing the received merchant identifier to the list of participating merchants stored within the database upon the determination that the account number associated with the co-brand payment card is within the account range associated with the private label merchant screening service;
   manipulate the authorization request received from the acquirer computer system to include a private label identifier when the transaction is determined by said interchange network server system to have originated at one of the participating merchants; and
   transmit an authorization response to the acquirer computer system after receiving the authorization response from an issuer computer system, the authorization response including the private label identifier, the authorization response designating the transaction for processing as a private label transaction, the private label identifier used for clearing and settling the transaction.

13. A system according to claim 12 wherein said server system is further configured to:
   store account data within the database, the account data including data representing a plurality of accounts registered with the network interchange, the plurality of accounts including co-brand accounts and non co-brand accounts, each of the plurality of accounts having a cardholder, a payment card and an account number associated therewith, the account data further including a co-brand identifier associated with each payment card designated as a co-brand payment card.

14. A system according to claim 13 wherein said server system is further configured to:
   determine from the received authorization request that the transaction was initiated using one of the co-brand payment cards by detecting the co-brand identifier associated with the co-brand payment card used in the transaction.

15. A system according to claim 12 wherein said server system is further configured to:
   populate a product code data field included with the authorization request with the private label identifier.

16. A system according to claim 15 further comprising an issuer computer system associated with the issuer and coupled to said server system, said server system further configured to:
   transmit the authorization request with the private label identifier to the issuer computer system; and
   receive the authorization response from the issuer computer system, the authorization response including the private label identifier and approval data, wherein the approval data includes confirmation from the issuer that the cardholder has sufficient funds to settle the transaction.

17. A system according to claim 12 wherein said server system is further configured to:
   transmit the authorization response with the private label identifier to the acquirer computer system, wherein the authorization response is further transmitted to the participating merchant to approve the transaction, and wherein the authorization response instructs the acquirer computer system to designate the transaction as a private label transaction.

18. A system according to claim 12 wherein said server system is further configured to:
   receive settlement data from the acquirer computer system corresponding to the transaction, the settlement data including the private label identifier for identifying the settlement data for processing as a private label transaction, wherein the settlement data represents monetary funds being transferred between the issuer, the acquirer and the participating merchant for completing the transaction.

19. A system according to claim 18 wherein the database stores interchange rates for a plurality of different types of transactions, and wherein said server system is further configured to:
   determine that the settlement data received from the acquirer computer system is identified as being associated with a private label transaction;
   determine a private label interchange rate for the private label transaction; and
   process the private label transaction at the private label interchange rate.

20. A system according to claim 18 wherein the database stores rewards program data, and wherein said server system is further configured to:
   determine that the settlement data received from the acquirer computer system is identified as being associated with a private label transaction;
   retrieve rewards program data from the database for the private label transaction when the private label transaction is eligible for a private label rewards program; and
   transmit the settlement data along with the retrieved rewards program data to the issuer for processing.

21. A system according to claim 12 wherein the co-brand payment card is associated with a single co-brand merchant partner, the single co-brand merchant partner being a single business entity having multiple points of sale, the co-brand payment card configured to allow the cardholder to initiate private label transactions at any of the points of sale of the single co-brand merchant partner or initiate non-private label transactions with merchants other than the single co-brand merchant partner that are registered with the interchange network.

22. A system according to claim 12 wherein the co-brand payment card is associated with a coalition of co-brand merchant partners, the coalition of co-brand merchant partners including a plurality of merchant partners each merchant partner being a separate business entity, the co-brand payment card configured to allow the cardholder to initiate private label transactions at any of the coalition merchant partners or initiate non-private label transactions with merchants other than the coalition merchant partners that are registered with the interchange network.

23. A multi-party interchange network computer for processing a financial transaction using a co-brand proprietary payment card, the co-brand payment card is associated with a cardholder and a co-brand program, the co-brand program including an issuer, a co-brand merchant partner, and a multi-party payment card interchange network, said interchange network computer having a memory, said interchange network computer programmed to:
store within the memory a list of merchants participating in a co-brand program with the interchange network and an account range associated with a private label merchant screening service;
receive an authorization request for the transaction from an acquirer involving the co-brand payment card, the authorization request received from an acquirer and including a merchant identifier and an account number associated with the co-brand payment card;
determine whether the account number associated with the co-brand payment card is within the account range associated with the private label merchant screening service;
determine whether the transaction originated at one of the participating merchants by comparing the received merchant identifier to the list of participating merchants stored within the memory upon the determination that the account number associated with the co-brand payment card is within the account range associated with the private label merchant screening service;
manipulate the authorization request received from the acquirer to include a private label identifier when the transaction is determined by the interchange network computer to have originated at one of the participating merchants; and
transmit an authorization response to the acquirer after receiving the authorization response from an issuer, the authorization response including the private label identifier, the authorization response designating the transaction for processing as a private label transaction, the private label identifier used for clearing and settling the transaction.

24. A computer according to claim 23 wherein said computer is programmed to:
populate a product code data field included with the authorization request with the private label identifier.

25. A computer according to claim 24 wherein said computer is programmed to:
transmit the authorization request with the private label identifier to the issuer; and
receive the authorization response from the issuer, the authorization response including the private label identifier and approval data, wherein the approval data includes confirmation from the issuer that the cardholder has sufficient funds to settle the transaction.

26. A computer according to claim 23 wherein said computer is programmed to:
transmit the authorization response with the private label identifier to the acquirer, wherein the authorization response is further transmitted to the participating merchant to approve the transaction, and wherein the authorization response instructs the acquirer to designate the transaction as a private label transaction.

27. A computer according to claim 23 wherein said computer is programmed to:
receive settlement data from the acquirer corresponding to the transaction, the settlement data including the private label identifier for identifying the settlement data for processing as a private label transaction, wherein the settlement data represents monetary funds being transferred between the issuer, the acquirer and the participating merchant for completing the transaction.

28. A computer according to claim 27 wherein the memory stores interchange rates for a plurality of different types of transactions, and wherein said computer is programmed to:
determine that the settlement data received from the acquirer is identified as being associated with a private label transaction;
determine a private label interchange rate for the private label transaction; and
process the private label transaction at the private label interchange rate.

29. A computer according to claim 27 wherein the memory stores rewards program data, and wherein said computer is programmed to:
determine that the settlement data received from the acquirer is identified as being associated with a private label transaction;
retrieve rewards program data from the memory for the private label transaction when the private label transaction is eligible for a private label rewards program; and
transmit the settlement data along with the retrieved rewards program data to the issuer for processing.

30. A non-transitory computer readable medium storing a computer program for processing a financial transaction using a co-brand proprietary payment card and a multi-party payment card interchange network computer, the co-brand payment card is associated with a cardholder and a co-brand program, the co-brand program including an issuer, a co-brand merchant partner, and a multi-party payment card interchange network, said program is executed by the interchange network computer and comprises at least one code segment that, when executed by a computer, causes the computer to perform the steps of:
storing within a database a list of merchants participating in a co-brand program with the interchange network and an account range associated with a private label merchant screening service;
receiving an authorization request for the transaction from an acquirer involving the co-brand payment card, the authorization request received from an acquirer and including a merchant identifier and an account number associated with the co-brand payment card;
determining whether the account number associated with the co-brand payment card is within the account range associated with the private label merchant screening service;

determining whether the transaction originated at one of the participating merchants by comparing the received merchant identifier to the list of participating merchants stored within the database upon the determination that the account number associated with the co-brand payment card is within the account range associated with the private label merchant screening service;

manipulating the authorization request from an acquirer to include a private label identifier when the transaction is determined by the interchange network computer to have originated at one of the participating merchants; and transmitting an authorization response to the acquirer after receiving the authorization response from an issuer, the authorization response including the private label identifier, the authorization response designating the transaction for processing as a private label transaction, the private label identifier used for clearing and settling the transaction.

31. A non-transitory computer readable medium according to claim 30 further comprising at least one code segment that, when executed by the computer, causes the computer to perform the step of populating a product code data field included with the authorization request with the private label identifier.

32. A non-transitory computer readable medium according to claim 31 further comprising at least one code segment that, when executed by the computer, causes the computer to perform the steps of:
transmitting the authorization request with the private label identifier to the issuer; and
receiving the authorization response generated by the issuer, the authorization response including the private label identifier and approval data, wherein the approval data includes confirmation from the issuer that the cardholder has sufficient funds to settle the transaction.

33. A non-transitory computer readable medium according to claim 30 further comprising at least one code segment that, when executed by the computer, causes the computer to perform the step of:
receiving settlement data from the acquirer corresponding to the transaction, the settlement data including the private label identifier for identifying the settlement data for processing as a private label transaction, wherein the settlement data represents monetary funds being transferred between the issuer, the acquirer and the participating merchant for completing the transaction.

34. A non-transitory computer readable medium according to claim 33 further comprising at least one code segment that, when executed by the computer, causes the computer to perform the steps of:
determining that the settlement data received from the acquirer is identified as being associated with a private label transaction;
determining a private label interchange rate for the private label transaction; and
processing the private label transaction at the private label interchange rate.

35. A non-transitory computer readable medium according to claim 33 further comprising at least one code segment that, when executed by the computer, causes the computer to perform the steps of:
determining that the settlement data received from the acquirer is identified as being associated with a private label transaction;
generating rewards program data for the private label transaction when the private label transaction is eligible for a private label rewards program; and
transmitting the settlement data along with the rewards program data to the issuer for processing.

* * * * *